Figure 1A:
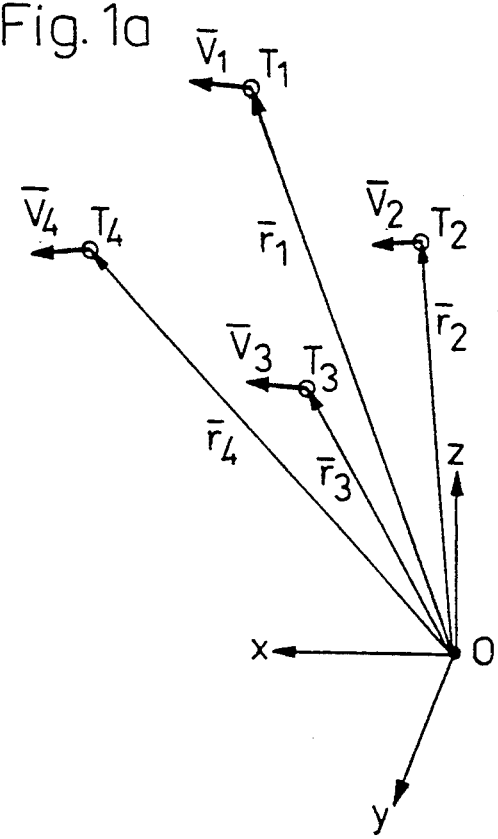

United States Patent [19]
Karlsen

[11] Patent Number: 5,258,962
[45] Date of Patent: Nov. 2, 1993

[54] ACOUSTIC PROJECTILE TRAJECTORY EVALUATION DEVICE

[75] Inventor: Lasse Karlsen, Lidingö, Sweden

[73] Assignee: Techsonic Aerosystems AB, Solna, Sweden

[21] Appl. No.: 930,430

[22] PCT Filed: Jan. 18, 1991

[86] PCT No.: PCT/SE91/00036
§ 371 Date: Sep. 15, 1992
§ 102(e) Date: Sep. 15, 1992

[87] PCT Pub. No.: WO91/10876
PCT Pub. Date: Jul. 25, 1991

[30] Foreign Application Priority Data
Jan. 18, 1990 [SE] Sweden .............................. 9000178

[51] Int. Cl.$^5$ .............................................. F41J 5/06
[52] U.S. Cl. ...................................... 367/127; 367/906
[58] Field of Search ............ 367/127, 906; 244/1 TD; 273/372

[56] References Cited
U.S. PATENT DOCUMENTS
4,323,993  4/1982  Söderblom et al. ............... 367/127
4,805,159  2/1989  Negendank et al. ............... 367/127

Primary Examiner—Daniel T. Pihulic
Attorney, Agent, or Firm—Limbach & Limbach

[57] ABSTRACT

This invention is concerned with an indicator apparatus for determination of the trajectory or the trajectory direction of a projectile travelling at supersonic speed. It comprises pressure sensitive transducers ($T_1$-$T_4$), which have fixed positions relative to each other or move relative to each other in a defined way, and which are devised to measure the pressure wave generated by the projectile. Also, there are means to produce electrical signals from the transducers, which represent the pressure values sensed by the transducers. Using said signals from each pressure transducer the computing circuits determine a value for a time instance when the pressure wave pass the transducer. From these time values and the geometrical quantities, which specify the position of each transducer in relation to a spatial coordinate system, the computing circuits evaluate the direction of the projectile trajectory more or less accurately. In this way the location of the projectile launching point is also more or less accurately determined. In a preferred implementation the computing circuits are designed to use values from four pressure transducers with known movement and the pressure wave from at least two and preferably three projectiles following each other with approximately the same trajectory direction. Alternatively, the computing circuits are designed to use values from at least eight or, for very high accuracy, twelve pressure transducers assembled in clustered groups of four transducers each, and the pressure wave from at least one projectile.

22 Claims, 5 Drawing Sheets

ACOUSTIC PROJECTILE TRAJECTORY EVALUATION DEVICE

The present invention is concerned with an apparatus for determination of the trajectory or the direction of the trajectory or movement of a projectile, or, more specifically, the approach direction, the velocity, and the distance of a specified target.

Several indicator devices of this kind are known in the prior art, which more or less accurately give the distance from the trajectory of a projectile to a target, to which the corresponding apparatus is assumed to be attached, see for example the International application WO79/00452, applicant Swedair AB, and the art described and cited therein. In this document is also described how it is possible to determine the approach direction of the projectile as well as its trajectory. The trajectory direction is in many cases the important information, and even an approximate indication of the direction can be of great value. This is for example the case when an aircraft is being fired upon, when the said information can be used to choose a suitable passage for retreat. The present invention, in one of its embodiments, is particularly well suited to this type of indication when one or more projectiles having approximately the same trajectory direction pass near a target.

From the International Application WO 87/05706 for MS Instruments PLC a measuring apparatus is previously known for measurement of the position of a projectile moving at supersonic speed. Therein two groups or clusters are provided, each comprising three transducers and all being fixedly mounted in space, in such a way that all pressure transducers of both clusters are positioned in a single vertical plane, this plane forming a target area. By means of time measurements only, or, more particularly, the time difference between those time instances when a pressure wave generated by a projectile hits the respective transducer, a straight line is determined for each group of transducers passing through the point, at which said projectile passes through the vertical target plane. Any information of the velocity of sound and the projectile is not required. A fourth transducer can be added to each transducer cluster and be positioned at a distance from its associated cluster in a direction located approximately along the trajectory of the projectile, this trajectory obviously being assumed to be perpendicular to said target plane. From the time measurement obtained from this fourth pressure transducer the velocity of the projectile can be calculated.

According to the invention a varying number of pressure transducers, which for example all are rigidly attached to the target, may be used. To approximately indicate the approach direction of the projectiles it may be sufficient to use only four transducers, geometrically arranged in a suitable way, specifically they should not be located in the same plane. A more accurate determination of the trajectory direction is possible if several rounds in a salvo are detected. An alternative possibility is to set up a larger number of pressure transducers, located together in groups of four, which may then directly provide the trajectory direction for a single projectile, and also its actual trajectory.

In the general case always one or more, preferably three groups of at least four transducers are used according to the invention. These pressure transducers are generally completely movable, for instance they may be located rigidly attached to a moving target. In addition, primarily the trajectory direction is determined, that is the direction of the segment of said trajectory, from which the pressure wave sensed by the pressure transducers is generated. In contrast to the International application for MS Instruments PLC the positions of the above straight lines are not determined. Instead more complex relations are utilized which in an optimal way make use of the time data measured and the information known in advance of the position and movement of the pressure transducers.

In the target indication system, described in detail in the above mentioned document WO79/00452, time measurements as well as measurements of the characteristics of the individual pressure waves have to be used in the trajectory determination. For a specific type of projectile, together with its speed, the latter measurements determine in a unique way the distance from the transducer to the point of origin of the pressure wave on the trajectory. To establish the necessary relations between this distance and the characteristics of the pressure wave, calibration firing must be carried out with the projectile at different speeds. This type of calibration is obviously costly and adds to the amount of preparations that is necessary before the system can be used for its intended purpose. These procedures are further complicated by the actual necessity to measure the speed of the projectile, which also adds to the complexity of the preparations. When two or, for a more accurate indication, three groups of transducers, so called clusters, are used in the present target indication system, there is no need for any calibration firing, and the trajectories of individual rounds are obtained directly. This of course also means that the indicator apparatus according to the present invention can be applied to obtain calibration data to be used in the prior art devices. According to the invention it is also, as an alternative, possible to use measured data from a single transducer group if data are available for at least two and preferably three projectiles having approximately the same trajectory direction.

Using the apparatus according to the invention information about the trajectory of the projectile is obtained. If the signals from the pressure transducers are analyzed with respect to the characteristics mentioned above, i.e. those which are used in the apparatus according to the above mentioned document to determine the trajectory, the results can be used alternatively to gain information on the type of projectile and its velocity, which provides a possibility for projectile identification.

According to one embodiment of the invention four pressure transducers are combined into a portable unit which is connected to corresponding analysis circuits and devices to display the obtained result. This type of apparatus can also be mounted on a ground vehicle or an aircraft, for example a helicopter.

According to another embodiment of the invention two, or preferably three, groups of four pressure transducers each are located in fixed positions on the ground with relatively large distances between the groups. For every pressure wave that moves past such a device the associated projectile trajectory may be determined. This can be accomplished for a single projectile or for every single round in a salvo of several projectiles. The additional information obtained from the characteristics of the pressure waves may be used to determine if the projectiles are of the same type or if projectiles of different types pass the measurement device.

Figure 1B:
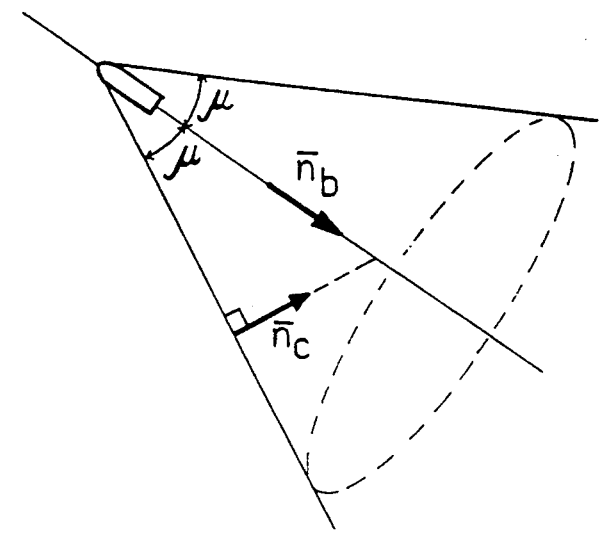
Figure 2:
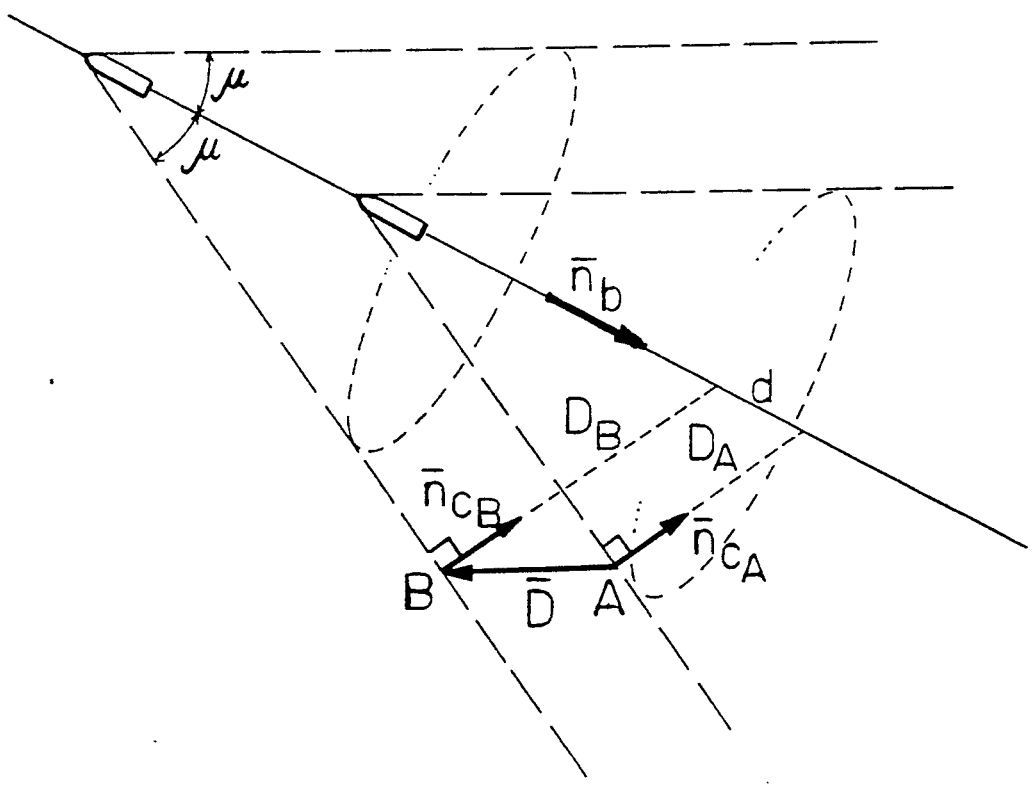
Figure 3:
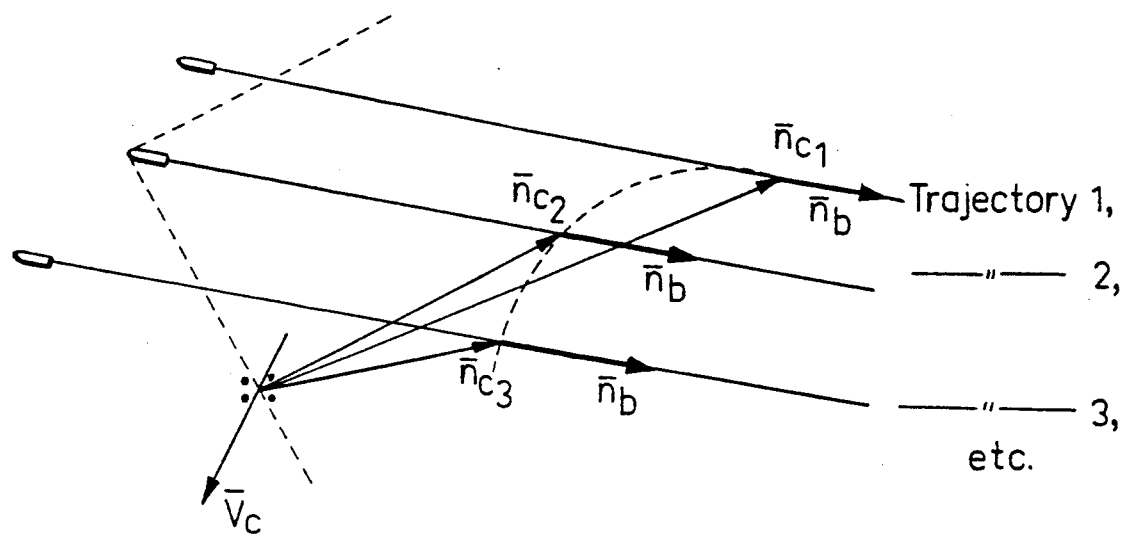
Figure 4:
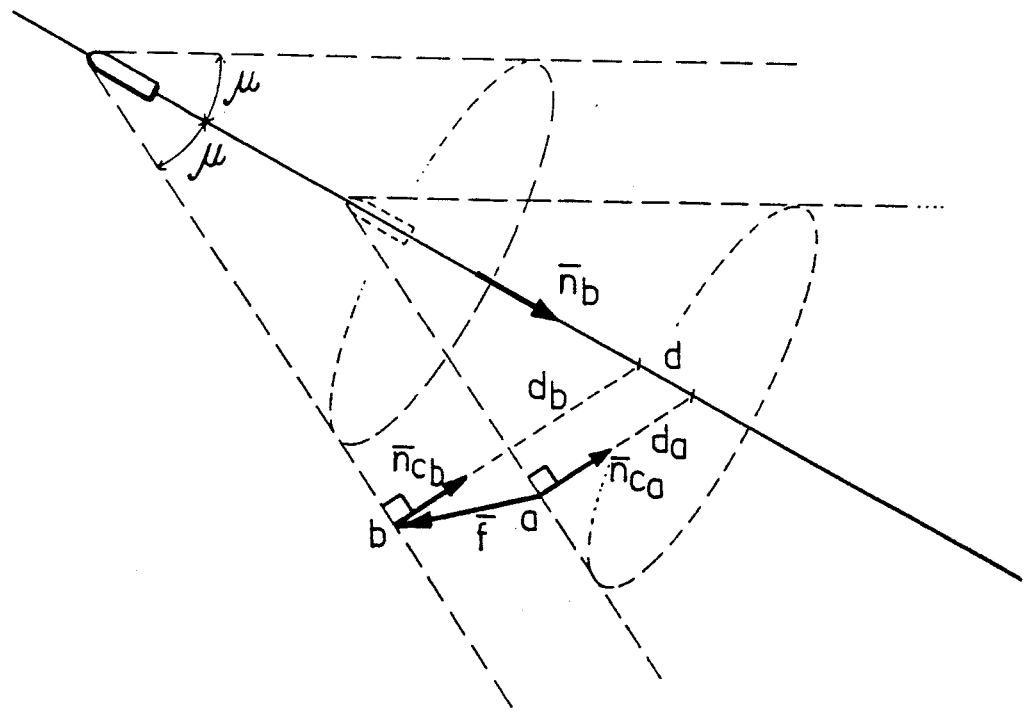
Figure 5:
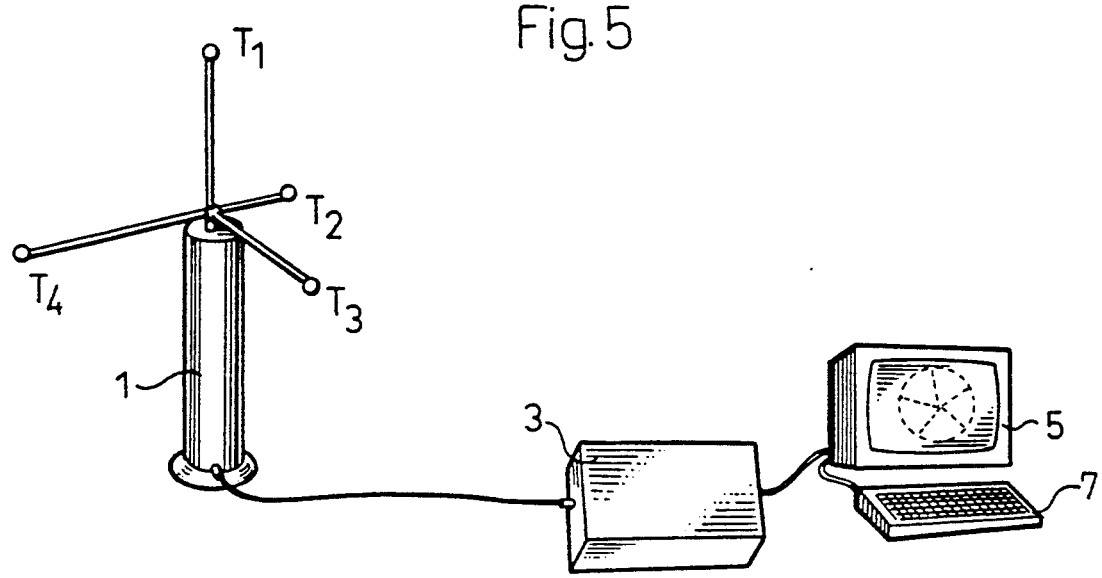
Figure 6:
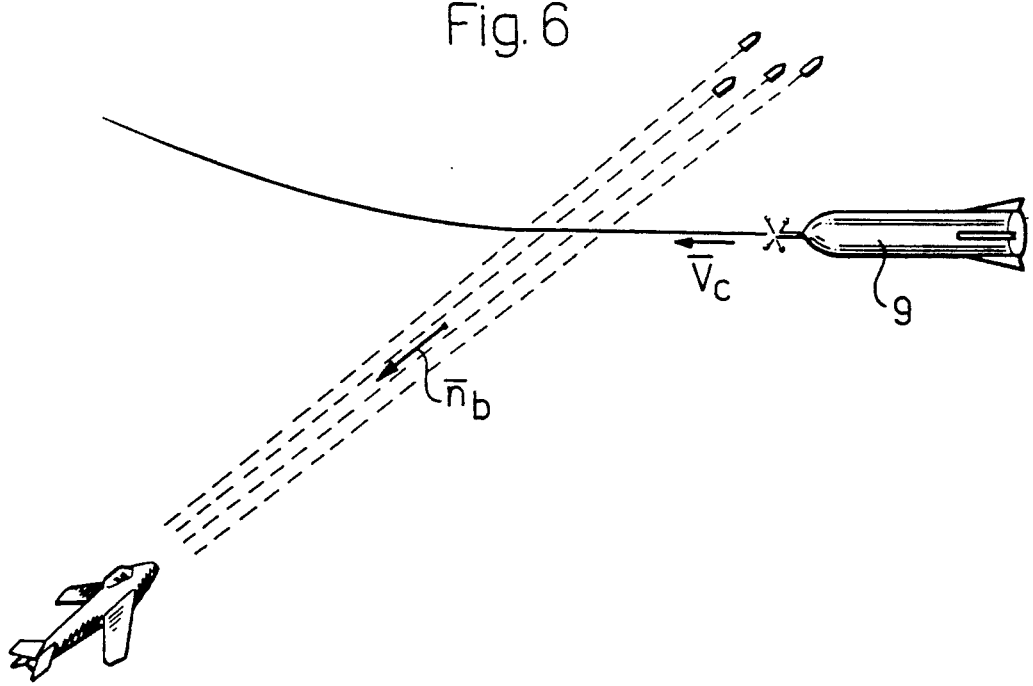
Figure 7A:
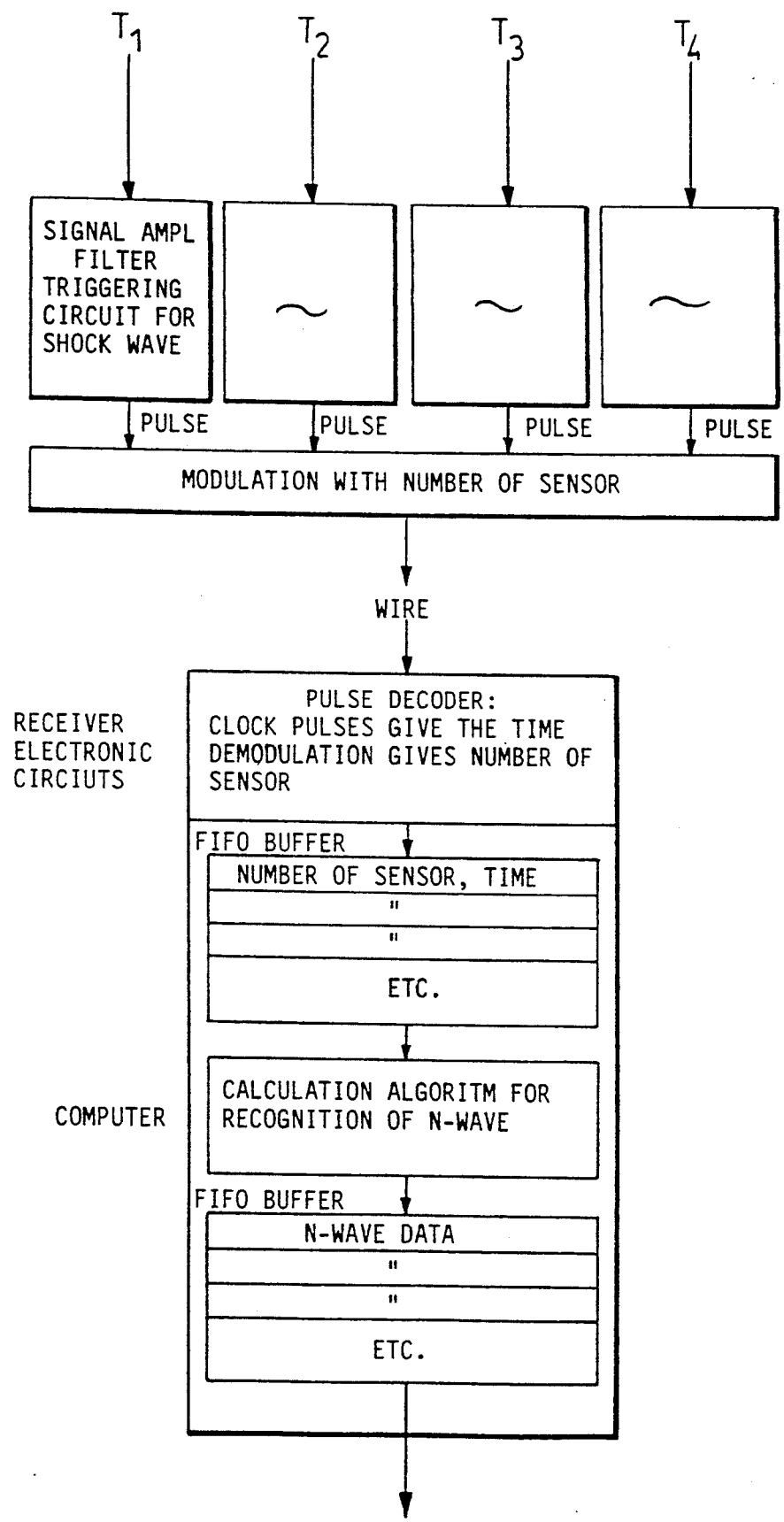
Figure 7B:
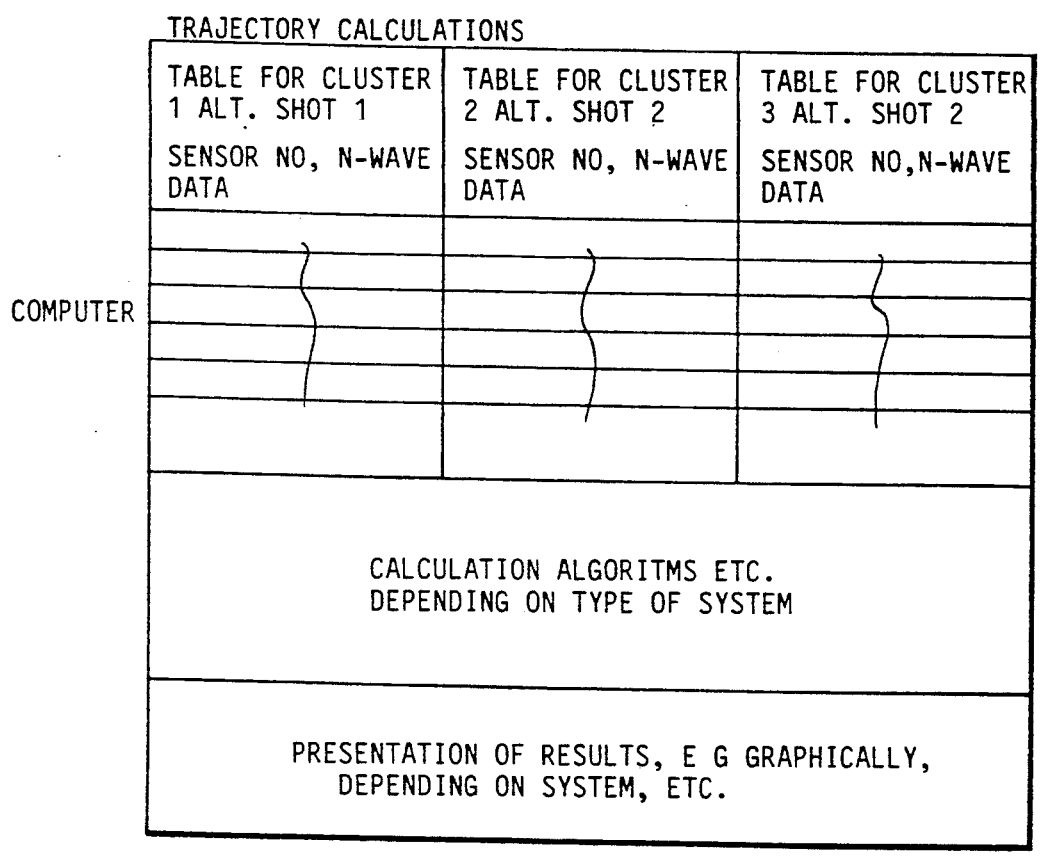

The invention will now be described with reference to the accompanying drawings on which FIGS. 1a and 1b schematically show the geometrical relations pertaining to the pressure transducers, the projectile trajectory, and the pressure wave, FIG. 2 schematically shows a cluster of pressure transducers which is hit by pressure waves from two different projectiles having the same trajectory, FIG. 3 schematically shows a situation similar to that in FIG. 2 but the cluster is hit by pressure waves from several different projectiles having the same movement direction and parallel trajectories, FIG. 4 schematically shows two clusters having fixed positions in relation to each other, which are successively hit by the same pressure wave, FIG. 5 schematically shows a portable pressure transducer system, FIG. 6 schematically shows the device when used in connection with practice firing against a towed target, FIGS. 7a and 7b show a block diagram of the system.

FIG. 1 shows four pressure transducers $T_1$-$T_4$ spaced from one another, which preferably are not located in the same geometrical plane. They may be part of a geometrical arrangement of a previously known type, and for example they may be located at the corners of a regular tetrahedron as is the case in the above mentioned International patent application. The pressure transducers are designed to measure the air pressure, and specifically the may be adapted to measure only the pressure waves generated by a projectile travelling at supersonic speed or possibly at a speed near the velocity of sound. The position of each pressure transducer $T_i$ is given by a vector $\bar{r}_i$ in a coordinate system Oxyz which is fixed in space or in relation to the atmosphere, and the pressure transducer $T_i$ is assumed to move with the velocity $\bar{V}_i$ in this coordinate system. The vector $\bar{r}_i$ corresponding to the pressure transducer $T_i$ can then be expressed by $$\bar{r}_i = \bar{r}_{i,t=0} + \bar{V}_i \cdot t \quad (1)$$

where $\bar{r}_{i,t=0}$ denotes the location of the pressure transducer at the time $t=0$ and the variable $t$ generally designates the time.

A plane pressure wave is now assumed to travel through the air. It is detected by each pressure transducer $T_i$ at the time $t_i$. It is further assumed that $\bar{n}_c$ is a unit vector directed towards the arriving pressure wave, i.e. a vector normal or orthogonal to the said wave. If the speed of sound is denoted by a, the distance travelled by the pressure wave from the time $t_i$ when it passes the transducer $T_i$ to the time $t_k$ when it passes the transducer $T_k$ is $$a(t_i - t_k) \quad (2).$$

The position of the pressure transducer $T_i$ at the time of arrival $t_i$ of the pressure wave is $$\bar{r}_{i,t=t_i} = \bar{r}_{i,t=0} + \bar{V}_i \cdot t_i \quad (3)$$

and a similar expression is valid for the transducer $T_k$. The projection onto the direction $-\bar{n}_c$, which is the direction of travel of the assumed plane pressure wave, of the difference between the position vectors $\bar{r}_i$ and $\bar{r}_k$ for the transducers $T_i$ and $T_k$ are accordingly $$(\bar{r}_{i,t=t_i} - \bar{r}_{k,t=t_k}) \cdot (-\bar{n}_c) \quad (4).$$

This is also an expression of the displacement of the wave from the time at the transducer $T_i$ to the time at $T_k$. This leads to the following equation:

$$a(t_i - t_k) = -((\bar{r}_{i,t=0} - \bar{r}_{k,t=0}) + \bar{V}_i \cdot t_i - \bar{V}_k \cdot t_k) \cdot \bar{n}_c \quad (5).$$

For the case when all transducers move with the same velocity this gives $$a(t_i - t_k) = -((\bar{r}_{i,t=0} - \bar{r}_{k,t=0}) + \bar{V}_c (t_i - t_k)) \cdot \bar{n}_c \quad (6).$$

The pressure transducers are connected to electronic circuits, which in some cases can be arranged to detect only the pressure waves having a pressure transient typical of waves generated by supersonic projectiles, i.e. so called N-waves.

In FIG. 2 it is shown schematically how a projectile 1 travelling at supersonic speed generates a pressure wave 3, shown in the Figure by the front or bow shock wave. This wave always has the shape of a conical surface defined by its axis, which is along the projectile flight path, and the cone apex angle $\mu$ between the axis and the wave surface. If the projectile Mach number is $M_p$, then $$\mu = \arcsin(1/M_p) \quad (7).$$

If the unit vector along the projectile path, with positive direction from the projectile to its launching point, i.e. opposite to the projectile velocity, is denoted by $\bar{n}_b$, then the conical wave surface is given by $$\bar{n}_c \cdot \bar{n}_b = \cos(\pi/2 - \mu) = 1/M_p \quad (8).$$

In equation (5) there are three unknowns, namely the three components of $\bar{n}_c$. From the measured values in three transducers $T_i$ two equations of the type (5) are obtained. These two equations together with the condition $$/\bar{n}_c/ = 1 \quad (9)$$

which is of the second degree, result in two different solutions for $\bar{n}_c$. If alternatively the values from four transducers $T_i$ are utilized, three equations of the type (5) can be obtained. The solution of these equations uniquely determines $\bar{n}_c$, i.e. there is no ambiguity. At the same time much better accuracy is obtained for the value of $\bar{n}_c$. In equation (8) $\bar{n}_c$ can now be considered as known from the measurements, which leaves four unknowns. These are the components of $\bar{n}_b$, which are related by the further condition $$/\bar{n}_b/ = 1 \quad (10)$$

and the Mach number $M_p$. With a sufficient number of known $\bar{n}_c$ values both $\bar{n}_b$ and $M_p$ can be determined.

In the quadratic equations (5) and (8) there are hence a total of five unknowns. In order to deduce the possible solutions for these unknowns at least five independent relations are necessary. To be able to determine which one of the possible solutions that is the correct physical result, one additional equation is required, i.e. a total of six equations, which includes (5) and (8), but not (9) or (10). It appears that five equations of the type (5) would be sufficient, corresponding to measured values from six pressure transducers $T_i$. However, with three equations of the type (5), additional equations of the same type do not provide any added information, since the latter can be derived from linear combinations of the first three equations.

This is also apparent from equation (8). For the same pressure wave, i.e. bow shock wave, at least three values of $\bar{n}_c$ would seem to be required. However, only two such values are actually necessary, which may be obtained in different ways. This will be shown in the following.

It has been assumed above that the pressure wave which hits the transducers $T_i$ can be considered to be a plane wave. This is a good approximation as long as the pressure transducers are located closely together in space, i.e. when the distance between them are much smaller than the typical local radius of curvature of wave near the transducers. A typical distance of this kind would be 10–50 cm. At this point it is assumed that this condition is satisfied and that the pressure transducers are hit by pressure waves in succession, which originates from two projectiles with the same trajectory. This case is shown schematically in FIG. 2. The four transducer cluster is hence assumed to be hit by pressure waves at the points A and B at the time instances $t_A$ and $t_B$ respectively. The space vector $\bar{D}$, which connects the two points from A towards B, can be expressed as $$\bar{D} = \bar{V}_c(t_B - t_A) \qquad (11)$$

where $V_c$ is the velocity vector of the cluster as before. It is further assumed that the distances from the cluster to the projectile trajectory at these points are $D_A$ and $D_B$ respectively. The distance along the trajectory between the two point where the two waves are generated are denoted by d. From the geometry of the quadrangle formed by the these two generating points and the points A and B, the following vector equation results:

$$\bar{V}_c(t_B - t_A) = D_A \cdot \bar{n}_{cA} - d \cdot \bar{n}_b - D_B \cdot \bar{n}_{cB} \qquad (12)$$

where $\bar{n}_{cA}$ is assumed to be different from $\bar{n}_{cB}$.

The nine primary unknowns are the components of $\bar{n}_{cA}$, $\bar{n}_{cB}$, and $\bar{n}_b$, which are related by the following equations:

one equation of type (6) for each one of $\bar{n}_{cA}$ and $\bar{n}_{cB}$, corresponding to a total of six linear equations for the components of $\bar{n}_{cA}$ and $\bar{n}_{cB}$, one equation of type (9) for each one of $\bar{n}_{cA}$ and $\bar{n}_{cB}$, corresponding to two quadratic equations for the components of $\bar{n}_{cA}$ and $\bar{n}_{cB}$, one equation of type (10), corresponding to a quadratic equation for the components of $\bar{n}_b$, equation (8), which for this case can be expressed as $$\bar{n}_{cA} \cdot \bar{n}_b = \bar{n}_{cB} \cdot \bar{n}_b \qquad (13)$$

or $$(\bar{n}_{cA} - \bar{n}_{cB}) \cdot \bar{n}_b = 0 \qquad (14).$$

There are hence a total of ten equations of the first or second degree for the nine unknowns. From these equations it is therefore possible to uniquely evaluate $\bar{n}_{cA}$, $\bar{n}_{cB}$ and $\bar{n}_b$ with some numerical overdetermination.

From the equations for $\bar{n}_{cA}$ and $\bar{n}_{cB}$ corresponding to equation (8) the Mach number $M_p$ of the projectiles can also be determined.

Furthermore, values for $D_A$, $D_B$, and d are given by equation (12). With these measured and computed values a complete description of the projectile trajectory is obtained. It is therefore also possible to compute a miss distance from the trajectory to a given target point. It should be observed that this is done only by means of the measured time instances, and that any other characteristic property of the detected pressure waves are not needed.

From the description above it is also true that even with only a single measurement of $\bar{n}_c$ it is possible to indicate that the launching or firing point of the projectile is located in that half of space towards which $\bar{n}_c$ is pointing. This result is independent of the Mach number $M_p$ of the projectile. If an estimate of the maximum possible Mach number, $M_{p,max}$, is given, then the said space is further limited to the locations which satisfy $$\bar{n}_c \cdot \bar{n}_b \geq 1/M_{p,max} \qquad (15).$$

This is the interior of a cone with axis $\bar{n}_c$ and cone apex angle $(\pi/2 - \arcsin(1/M_{p,max}))$.

With two measurements of $\bar{n}_c$, as stated above, it is possible to determine the direction $\bar{n}_b$ as well as the trajectory of the projectile in relation to the trajectory of the target. When additional pressure waves are detected from projectiles with the same trajectory direction, better accuracy can be obtained for the calculated results, for example by means of finding the minimum of a suitable weighting function.

A good indication can therefore be obtained with at least two or preferably three measurements of $\bar{n}_c$. This is dependent upon the scatter of the projectile trajectories within a salvo and the distance from the measuring transducer cluster to the trajectories. The motion of the cluster in relation to the firing point of the projectiles is important in the calculations. These points are further elaborated in the following paragraphs.

It is now assumed that several rounds are fired in a salvo towards a moving target whose speed is known or can be measured. The target is equipped with a cluster of pressure transducers as explained above. The duration of the salvo is normally relatively short, so that it can be assumed that the distance travelled by the target is small in comparison with the firing distances of the individual rounds, i.e. from the projectile launching positions to the target. Under these conditions the trajectory direction $\bar{n}_b$ for each projectile can be assumed to be the same. This means that the trajectories are approximately parallel, but with different positions relative to the target. For the same reasons the Mach numbers of the projectiles as they pass the target can also be assumed to be the same.

The situation just described is shown in FIG. 3, using a frame of reference which is fixedly attached to the target, i.e. the reference frame has a pure translation with the same velocity as the target. The pressure wave is detected by the cluster for each projectile, and the direction $\bar{n}_c$ of the incoming waves are determined from equation (6) for each projectile. For each pair of two rounds, j and k, with different measured wave directions $\bar{n}_{cj}$ and $\bar{n}_{ck}$, the common trajectory direction $\bar{n}_b$ is contained in the geometrical plane defined by equation (14), i.e. the plane which is perpendicular to the direction given by $(\bar{n}_{cj} - \bar{n}_{ck})$. When at least three rounds are detected, two such planes may be defined. The actual trajectory direction $\bar{n}_b$ can then be determined from the intersection these two planes, which is a line that is parallel to $\bar{n}_b$. The correct sign, i.e. the choice between the two directions along the line, is determined from the fact that the right hand side of equation (8) is always greater than zero. Also, the Mach number $M_p$ is given from equations of type (8). If even more rounds are detected, the additional information can be used to improve the evaluated results, as well as to obtain an estimate of their accuracy by means of statistical methods. The method as described is the basis for implementation of the direction indicator apparatus.

If measurements such as expressed above have determined the direction of the projectile trajectories within a calculated three-dimensional conical sector according to the method described (equation (15)), it is then possible to use the known relations between the further physical properties of the detected pressure wave, the N-wave, and the distance to the point on the trajectory where the wave was generated to calculate the complete trajectory of the projectile relative to the transducer cluster or the specified target.

Another possibility for determination of the projectile trajectory is to use more pressure transducers, which are also arranged in space into relatively compact clusters. This means that the distances between the transducers within a cluster are small compared to the distance between two clusters. If accordingly a system consisting of two such clusters, a and b, are used, the wave directions $\bar{n}_{ca}$ and $\bar{n}_{cb}$ are directly obtained from the measurements and from equation (6). This case is shown schematically in FIG. 4 where the known constant vector $\bar{f}_0$ is the location of one of the clusters b in relation to the other cluster a. The distance from the point on the trajectory where the pressure wave is generated is $d_a$ for point a and $d_b$ for point b. The distance along the trajectory between these two wave generation points is d. Furthermore, the corresponding time instances when the pressure wave passes are $t_a$ and $t_b$ for the points a and b respectively. From the description above the following equation is immediately obtained:

$$d_a \cdot \bar{n}_{ca} - d \cdot \bar{n}_b = \bar{f} + d_b \cdot \bar{n}_{cb} \qquad (16).$$

The vector $\bar{f}$, which connects the two points a and b when these are hit by the pressure wave at the times $t_a$ and $t_b$, is given by the expression $$\bar{f} = \bar{f}_0 + \bar{V}_c \cdot (t_a - t_b) \qquad (17).$$

The equations (16) and (17) lead to $$d_a \cdot \bar{n}_{ca} - d \cdot \bar{n}_b - d_b \cdot \bar{n}_{cb} = \bar{f}_0 + \bar{V}_c \cdot (t_a - t_b) \qquad (18).$$

As shown above for the case with one cluster and two pressure waves, values for $\bar{n}_{ca}$, $\bar{n}_{cb}$ and $\bar{n}_b$ can be obtained from equations of type (6),
equations of type (9),
equation (10),
equation (8), which for this case gives $$(\bar{n}_{ca} - \bar{n}_{cb}) \cdot \bar{n}_b = 0 \qquad (19).$$

From these the unknowns can be determined, provided that $\bar{n}_{ca}$ and $\bar{n}_{cb}$ are not parallel.

Furthermore, equation (18) determines the values of $d_a$, $d_b$, and d. In this way a complete determination of the trajectory of the projectile is obtained.

Also, from the time instances $t_a$ and $t_b$ the projectile Mach number is obtained directly as $$M_p = d/(a(t_b - t_a) + d_a - d_b) \qquad (20).$$

This expression is obtained by considering the time instances when the projectile is at the two points in the trajectory where those parts of the wave are generated that later hits the points a and b respectively.

As already stated, the accuracy of the measured and calculated results can be improved, as may sometimes be preferable, by the addition of a third cluster of four pressure transducers. In this way three values of $\bar{n}_c$ are obtained for every projectile.

For an indicator apparatus according to the cited WO79/00452, which uses two clusters of four pressure transducers, the indicator apparatus according to the invention can be used for calibration. The previously known apparatus makes use of, as described above, the special characteristics of the pressure wave in order to determine significant geometrical data. The apparatus according to the invention do not require any such calibration measurements, which means that a calibration for the known system may be obtained by firing a few projectiles with the same trajectory direction, chosen so that the condition "$\bar{n}_{ca}$ and $\bar{n}_{cb}$ not being parallel" is satisfied. In this way the projectile trajectories may be determined as well the pressure wave characteristics which are typical for the type of projectile. As stated above, it is strictly only necessary to obtain measured values from a single projectile in this case, but in order to improve the accuracy of the results several projectiles may be used.

For a larger installation based on the ground a suitable configuration may consist of three clusters of four transducers each with relatively large separation between the clusters. Even more clusters can of course be used in order to improve the accuracy of the results obtained. Complete information as to the trajectories of the projectiles is obtained in this way solely from the time measurements according to the statements above. It is also possible to use measured data from several projectiles with the same trajectory direction. In this case the different projectiles need not be of the same type. According to the above the typical time history of the pressure wave may be used in order to identify the projectile type. With a sufficient number of measurements knowledge of the speed of sound is also unnecessary since this can be obtained from the equations.

A target or projectile trajectory indicator according to the invention can be either stationary or mounted on a ground, sea, or air vehicle.

FIG. 5 shows schematically a portable or transportable system for field use. This system consists of one cluster of pressure transducers $T_1$–$T_4$ mounted on a mechanical fixture or base 1. The electronics needed to drive the pressure transducers are located inside the fixture. From this electronic unit there is a connection, for example an electric cable, to a calculation unit 3 which performs the calculations necessary to determine the trajectory results. The calculation unit 3 is connected to a display in the normal way or to any other device that may be suitable for showing the evaluated trajectory direction. Together with the display 5 there may also be a common type of input device 7, such as a keyboard, in order to control the measurements and the calculations. This kind of apparatus may easily be placed at an arbitrary location in the terrain, from which it may be moved and put up again at another location. The apparatus may also for example be mounted on a ground vehicle such as a lorry.

With this type of portable apparatus the trajectory direction of fired projectiles can easily be determined.

A corresponding system can also be mounted on an aircraft such as a helicopter. If only a single projectile is fired against the aircraft, such an apparatus can indicate approximately the firing direction, which may be of very great value. If the aircraft is fired upon with several projectiles a more accurate determination of the projectile trajectories can be obtained as stated above.

Another example is an apparatus of the type stated above having only one cluster of transducers which may be mounted connected to a target 9 towed by an aircraft, said target being used for practice firing, see FIG. 6. In this case another aircraft can fire several projectiles towards the towed target with approximately the same trajectory direction. The direction $\bar{n}_b$ is evaluated from the measured data for all the rounds fired, the total number of rounds being at least three. Furthermore, complete information about the trajectory of each round relative to the cluster of pressure transducers may be calculated, and consequently also for example the miss distance. This can be accomplished if only the speed $/V_c/$ of the transducer cluster, i.e. the target, is known. Additionally, the speed of each projectile may be evaluated. With knowledge of ballistics data for the projectiles it is also possible to calculate for example the open fire distance, i.e. the distance from the firing position to the target.

The target indication apparatus may be physically implemented in the same way as the device disclosed in the above cited WO79/00452. It is only necessary to allocate a suitable number of transducer clusters as required by the actual case. Apart from this the computing circuits must be modified for the invention.

One system according to the invention is shown schematically in FIGS. 7a and 7b. From the four pressure transducers $T_1$-$T_4$ of a cluster signals are fed to the corresponding transducer electronics, which are normally located directly in connection with the transducer cluster, and typically consist of signal amplifiers, filters, and triggering circuits for shock wave detection. The signal pulses from the transducer electronics are modulated in a manner special to each pressure transducer, i.e. in such a way that the transducer number can be identified from the modulated signal. The modulated signal is transmitted over the cable, which may be a coaxial cable, optical fibre cable, or any other equivalent data transmission channel, to the main part of the electronics, which incorporates the computing circuits. In the receiver electronics the signal pulses first enter a pulse decoder with triggering and clock circuits from which the time data as well as the corresponding transducer number are obtained. In the computing circuits, which may be implemented in the form of a conventional microcomputer, the data obtained are stored in a first buffer. One computing block handles the calculations necessary for the recognition of the characteristic data for the pressure wave, i.e. wave direction $\bar{n}_c$ and time intervals between N-wave fronts. These calculated data are then stored in a second buffer. A second computing block uses the data from the second buffer for trajectory calculations. The evaluated results may subsequently be presented on a graphical display.

I claim:

1. A device for the determination of the direction of movement of a projectile having approximately supersonic speed comprising at least four pressure transducers which are fixedly arranged in relation to each other or which are adapted to move with constant velocities in relation to each other and in relation to a fixed reference frame for the atmosphere in a predetermined way, such that, at each time instance at least four of said pressure transducers are not located in the same geometrical plane, and the pressure transducers are arranged to sense the time instance at which the pressure or bow wave generated by the said projectile hits them;

calculating circuits for receiving electric signals representative of the hit time instances, wherein the calculating circuits are arranged to determine, using only the electric signals representative of the hit time instances, geometrical data indicating the position and movement of the pressure transducers in relation to said fixed reference frame or the atmosphere, and if required a value of the speed of sound as inputs, the direction of movement in three dimensions of the projectile and from this direction also to determine the location, from which the projectile was issued.

2. A device according to claim 1, wherein only four pressure transducers are arranged and wherein the calculating circuits are further arranged to determine from the calculated direction of the movement of said projectile that half space of said fixed reference frame for the atmosphere, the location from which the projectile was issued.

3. A device according to claim 1 wherein the calculating circuits are further arranged to determine, by means of a maximum value of the speed of the projectile, a conical surface in said fixed reference frame for the atmosphere, inside which conical surface the direction of the projectile is to be found, enabling the location of the position from which said projectile was issued.

4. A device according to claim 1 wherein only four pressure transducers are arranged and wherein the calculating circuits are arranged to determine, by means of the hit time instances obtained from the pressure waves of at least two projectiles having the same movement of direction, i.e. these projectiles moving in parallel.

5. A device according to claim 1 wherein at least three pressure transducers are arranged to move In relation to said fixed reference frame for the atmosphere, and further wherein the calculating circuits are arranged to determine the trajectory direction of at least two projectiles passing one after the other, these projectiles all having the same trajectory or having parallel trajectories, and further wherein the movement of all the pressure transducers used is adapted in such a way that the pressure transducers move a substantial distance between the time instances, when they are hit by the pressure waves generated by the different projectiles.

6. A device according to claim 1 wherein at least 8 pressure transducers are arranged, and further wherein these pressure transducers are located In localized groups of four transducers, and further wherein the distances of the pressure transducers of one cluster Is small compared to the distance between the centre of said groups, and further wherein the calculating circuits are arranged to use the measured hit time instances obtained from the pressure wave generated by only one projectile.

7. A device according to claim 4 wherein the calculating circuits are arranged to use the relation $$a(t_i-t_k)=-((\bar{r}_{i,t=o}-\bar{r}_{k,t=0})+\bar{V}_i\cdot t_i-\bar{V}_k\cdot t_k)\cdot \bar{n}_c$$

where
$\bar{n}_c$ is the normal vector of the pressure wave generated by the projectile, this vector being located in a direction opposite to the propagation direction of the wave, a is the speed of sound, $t_i$, $t_k$ are the time instances when the pressure wave generated by a projectile passes transducer No. i, k, respectively, $\bar{r}_{i,t=0}$, $\bar{r}_{k,t=0}$ are position vectors for transducer No. i and k, respectively, at the time t=0, $\bar{V}_i$, $\bar{V}_k$ are velocity vectors of transducer No. i and k, respectively, the vectors being referenced to the fixed reference frame for the atmosphere, and the relation $$\bar{n}_c\cdot\bar{n}_b=1/M_p$$

and $$\bar{n}_c\cdot\bar{n}_b=1/M_{p,max}$$

where
$\bar{n}_b$ is a unit vector along the trajectory of the projectile having its direction towards the issue point of said projectile, $M_p$ is the Mach number of the projectile, and $M_{p,max}$ is the maximal value of the Mach number of the projectile.

8. A device according to claim 5 wherein the calculating circuits are arranged to use the relation $$a(t_i-t_k)=-((\bar{r}_{i,t=o}-\bar{r}_{k,t=0})+\bar{V}_i\cdot t_i-\bar{V}_k\cdot t_k)\cdot \bar{n}_c$$

where
$\bar{n}_c$ is the normal vector of the pressure wave generated by the projectile, this vector being located in a direction opposite to the propagation direction of the wave, a is the speed of sound, $t_i$, $t_k$ are the time instances when the pressure wave generated by a projectile passes transducer No. i, k, respectively, $\bar{r}_{i,t=0}$, $\bar{r}_{k,t=0}$ are position vectors for transducer No. i and k, respectively, at the time t=0, $\bar{V}_i$, $\bar{V}_k$ are velocity vectors of transducer No. i and k, respectively, the vectors being referenced to the fixed reference frame for the atmosphere, and the relation $$\bar{n}_c\cdot\bar{n}_b=1/M_p$$

and $$\bar{n}_c\cdot\bar{n}_b=1/m_{p,max}$$

where
$\bar{n}_b$ is a unit vector along the trajectory of the projectile having its direction towards the issue point of the projectile, $M_p$ is the Mach number of the projectile, and $M_{p,max}$ is the maximal value of the Mach number of the projectile.

9. A device according to claim 6 wherein the calculating circuits are arranged to use the relation $$a(t_i-t_k)=-((\bar{r}_{i,t=o}-\bar{r}_{k,t=0})+\bar{V}_i\cdot t_i-\bar{V}_k\cdot t_k)\cdot \bar{n}_c$$

where
$\bar{n}_c$ is the normal vector of the pressure wave generated by the projectile, this vector being located in a direction opposite to the propagation direction of the wave, a is the speed of sound, $t_i$, $t_k$ are the time instances when the pressure wave generated by a projectile passes transducer No. i, k, respectively, $\bar{r}_{i,t=0}$, $\bar{r}_{k,t=0}$ are position vectors for transducer No. i and k, respectively, at the time t=0, $\bar{V}_i$, $\bar{V}_k$ are velocity vectors of transducer No. i and k, respectively, the vectors being referenced to the fixed reference frame for the atmosphere, and the relation $$\bar{n}_c\cdot\bar{n}_b=1/M_p$$

and $$\bar{n}_c\cdot\bar{n}_b=1/M_{p,max}$$

where
$\bar{n}_b$ is a unit vector along the trajectory of the projectile having its direction towards the issue point of the projectile, $M_p$ is the Mach number of the projectile, and $M_{p,max}$ is the maximal value of the Mach number of the projectile.

10. A device according to claim 1 wherein the calculating circuits are arranged to calculate, from the obtained data, the speed of the projectile.

11. A device according to claim 4 wherein the calculating circuits are arranged to calculate, from the obtained data, the speed of the projectile.

12. A device according to claim 5 wherein the calculating circuits are arranged to calculate, from the obtained data, the speed of the projectile.

13. A device according to claim 6 wherein the calculating circuits are arranged to calculate, from the obtained data, the speed of the projectile.

14. A device according to claim 1 wherein the calculating circuits are arranged to calculate, from the obtained data, the trajectory of the projectile and the miss distance, the miss distance being the distance from the pressure transducers to the trajectory of the projectile.

15. A device according to claim 4 wherein the calculating circuits are arranged to calculate, from the obtained data, the trajectory of the projectile and the miss distance, the miss distance being the distance from the pressure transducers to the trajectory of the projectile.

16. A device according to claim 5 wherein the calculating circuits are arranged to calculate, from the obtained data, the trajectory of the projectile and the miss distance, the miss distance being the distance from the pressure transducers to the trajectory of the projectile.

17. A device according to claim 6 wherein the calculating circuits are arranged to calculate, from the obtained data, the trajectory of the projectile and the miss distance, the miss distance being the distance from the pressure transducers to the trajectory of the projectile.

18. A device according to claim 10 wherein the calculating circuits are arranged to use the relation $$a(t_i-t_k)=-((\bar{r}_{i,t=o}-\bar{r}_{k,t=0})+\bar{V}_i\cdot t_i-\bar{V}_k\cdot t_k)\cdot \bar{n}_c$$

where
- $\bar{n}_c$ is the normal vector of the pressure wave generated by the projectile, this vector being located in a direction opposite to the propagation direction of the wave,
- $a$ is the speed of sound,
- $t_i$, $t_k$ are the time instances when the pressure wave generated by a projectile passes transducer No. i, k, respectively,
- $\bar{r}_{i,t=0}$, $\bar{r}_{k,t=0}$ are position vectors for transducer No. i and k, respectively, at the time $t=0$,
- $\bar{V}_i$, $\bar{V}_k$ are velocity vectors of transducer No. i and k, respectively,
- the vectors being referenced to the fixed reference frame for the atmosphere, and the relation $$\bar{n}_c \cdot \bar{n}_b = 1/M_p$$

and $$\bar{n}_c \cdot \bar{n}_b = 1/M_{p,max}$$

where
- $\bar{n}_b$ is a unit vector along the trajectory of the projectile having its direction towards the issue point of the projectile,
- $M_p$ is the Mach number of the projectile, and
- $M_{p,max}$ is the maximal value of the Mach number of the projectile.

19. A device according to claim 1 wherein the calculating circuits are arranged to use the relation $$a(t_i - t_k) = -((\bar{r}_{i,t=0} - \bar{r}_{k,t=0}) + \bar{V}_i \cdot t_i - \bar{V}_k \cdot t_k) \cdot \bar{n}_c$$

where
- $\bar{n}_c$ is the normal vector of the pressure wave generated by the projectile, this vector being located in a direction opposite to the propagation direction of the wave, a is the speed of sound,
- $t_i$, $t_k$ are the time instances when the pressure wave generated by a projectile passes transducer No. i, k, respectively,
- $\bar{r}_{i,t=0}$, $\bar{r}_{k,t=0}$ are position vectors for transducer No. i and k, respectively, at the time $t=0$,
- $\bar{V}_i$, $\bar{V}_k$ are velocity vectors of transducer No. i and k, respectively,
- the vectors being referenced to the fixed reference frame for the atmosphere, and the relation $$\bar{n}_c \cdot \bar{n}_b = 1/M_p$$

and $$\bar{n}_c \cdot \bar{n}_b = 1/M_{p,max}$$

where
- $\bar{n}_b$ is a unit vector along the trajectory of the projectile having its direction towards the issue point of the projectile,
- $M_p$ is the Mach number of the projectile, and
- $M_{p,max}$ is the maximal value of the Mach number of the projectile.

20. A device according to claim 2 wherein the calculating circuits are arranged to use the relation $$a(t_i - t_k) = -((\bar{r}_{i,t=0} - \bar{r}_{k,t=0}) + \bar{V}_i \cdot t_i - \bar{V}_k \cdot t_k) \cdot \bar{n}_c$$

where $\bar{n}_c$ is the normal vector of the pressure wave generated by the projectile, this vector being located in a direction opposite to the propagation direction of the wave, a is the speed of sound,
- $t_i$, $t_k$ are the time instances when the pressure wave generated by a projectile passes transducer No. i, k, respectively,
- $\bar{r}_{i,t=0}$, $\bar{r}_{k,t=0}$ are position vectors for transducer No. i and k, respectively, at the time $t=0$,
- $\bar{V}_i$, $\bar{V}_k$ are velocity vectors of transducer No. i and k, respectively,
- the vectors being referenced to the fixed reference frame for the atmosphere, and the relation $$\bar{n}_c \cdot \bar{n}_b = 1/M_p$$

and $$\bar{n}_c \cdot \bar{n}_b = 1/M_{p,max}$$

where
- $\bar{n}_b$ is a unit vector along the trajectory of the projectile having its direction towards the issue point of said projectile,
- $M_p$ is the Mach number of the projectile, and
- $M_{p,max}$ is the maximal value of the Mach number of the projectile.

21. A device according to claim 3 wherein the calculating circuits are arranged to use the relation $$a(t_i - t_k) = -((\bar{r}_{i,t=0} - \bar{r}_{k,t=0}) + \bar{V}_i \cdot t_i - \bar{V}_k \cdot t_k) \cdot \bar{n}_c$$

where
- $\bar{n}_c$ is the normal vector of the pressure wave generated by the projectile, this vector being located in a direction opposite to the propagation direction of the wave, a is the speed of sound,
- $t_i$, $t_k$ are the time instances when the pressure wave generated by a projectile passes transducer No. i, k, respectively,
- $\bar{r}_{i,t=0}$, $\bar{r}_{k,t=0}$ are position vectors for transducer No. i and k, respectively, at the time $t=0$,
- $\bar{V}_i$, $\bar{V}_k$ are velocity vectors of transducer No. i and k, respectively,
- the vectors being referenced to the fixed reference frame for the atmosphere, and the relation $$\bar{n}_c \cdot \bar{n}_b = 1/M_p$$

and $$\bar{n}_c \cdot \bar{n}_b = 1/M_{p,max}$$

where
- $\bar{n}_b$ is a unit vector along the trajectory of said projectile having its direction towards the issue point of the projectile,
- $M_p$ is the Mach number of the projectile, and
- $M_{p,max}$ is the maximal value of the Mach number of the projectile.

22. A device according to claim 14 wherein the calculating circuits are arranged to use the relation $$a(t_i - t_k) = -((\bar{r}_{i,t=0} - \bar{r}_{k,t=0}) + \bar{V}_i \cdot t_i - \bar{V}_k \cdot t_k) \cdot \bar{n}_c$$

where
- $\bar{n}_c$ is the normal vector of the pressure wave generated by the projectile, this vector being located in a direction opposite to the propagation direction of the wave, a is the speed of sound, $t_i$, $t_k$ are the time instances when the pressure wave generated by a projectile passes transducer No. i, k, respectively, $\bar{r}_{i,t=0}$, $\bar{r}_{k,t=0}$ are position vectors for transducer No. i and k, respectively, at the time t=0, $\bar{V}_i$, $\bar{V}_k$ are velocity vectors of transducer No. i and k, respectively, the vectors being referenced to the fixed reference frame for the atmosphere, and the relation $$\bar{n}_c \cdot \bar{n}_b = 1/M_p$$

and $$\bar{n}_c \cdot \bar{n}_b = 1/M_{p,max}$$

where $\bar{n}_b$ is a unit vector along the trajectory of the projectile having its direction towards the issue point of the projectile, $M_p$ is the Mach number of the projectile, and $M_{p,max}$ is the maximal value of the Mach number of the projectile.

* * * * *